United States Patent [19] [11] 4,441,042
Colwell [45] Apr. 3, 1984

[54] ELECTRIC MOTOR

[75] Inventor: Robert Colwell, Owosso, Mich.

[73] Assignee: Univeral Electric Company, Owosso, Mich.

[21] Appl. No.: 425,414

[22] Filed: Sep. 28, 1982

[51] Int. Cl.³ ............................................. H02K 15/00
[52] U.S. Cl. ....................................... 310/42; 310/89; 310/91
[58] Field of Search .................. 310/42, 89, 91, 258, 310/259, 90; 29/596

[56] References Cited

U.S. PATENT DOCUMENTS 3,289,018 11/1966 Schaefer ................................. 310/42
3,518,468 6/1970 Wightman ....................... 310/258 X
3,538,598 11/1970 Wightman et al. ............... 310/42 X
3,567,973 3/1971 Mastrodonato, Sr. et al. ...... 310/42

Primary Examiner—Donovan F. Duggan

Attorney, Agent, or Firm—Barnes, Kisselle, Raisch, Choate, Whittemore & Hulbert

[57] ABSTRACT

An electric motor comprising a motor frame comprising a generally cylindrical shell encircling a stator, and a pair of end members mounted on the ends of the shell rotatably supporting a rotor. The shell has at least one circumferentially extending slot spaced from an edge of the shell and a notch and edge aligned with the slot. A spring nut has one end thereof hooked into the slot and extending along the outer surface of the shell. The spring extends radially inwardly through the notch in underlying relationship to an end member associated with the end of the shell. The end member has an opening therethrough and the spring nut has a threaded opening aligned with the opening in said end member. A stud has a threaded end and an enlarged shoulder portion and the threaded end extends through the opening in the end member and is threaded into the opening of the spring nut to hold the stud in position on the end member.

15 Claims, 6 Drawing Figures

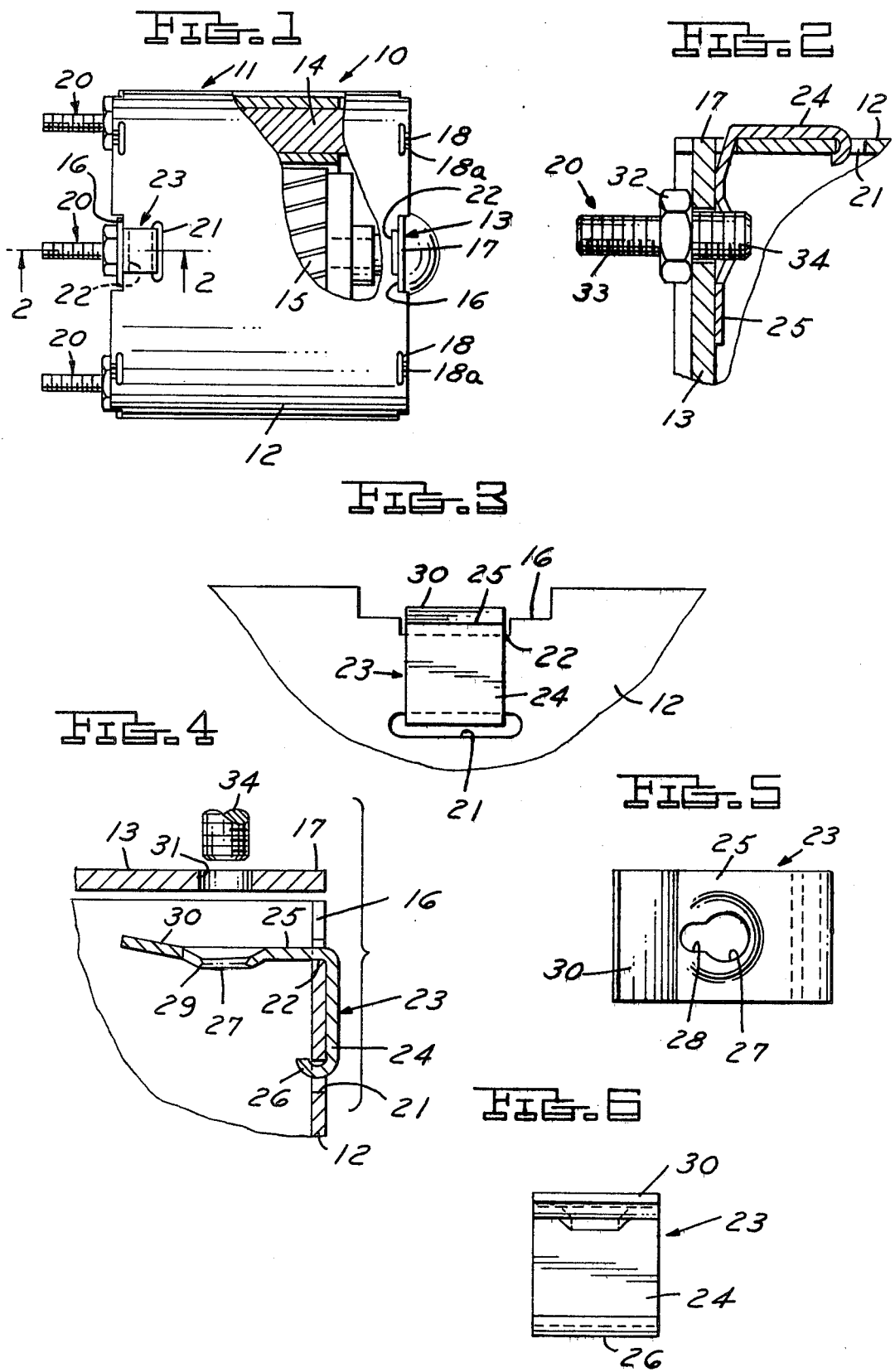

ELECTRIC MOTOR

This invention relates to electric motors.

BACKGROUND AND SUMMARY OF THE INVENTION

In one type of electric motor such as shown, for example, in U.S. Pat. No. 3,567,973, the motor has a motor frame comprising a generally cylindrical shell and a pair of end members. The shell encircles the stator of the motor and the end members are fastened to the shell to rotatably support the shaft of a rotor in order to maintain a proper air gap between the motor and the stator as described in U.S. Pat. No. 3,567,973. The end members are held in position by tabs on the end members which engage notches and by portions of the shell being deformed over the outer surface of the end members.

Other methods of fastening the end members comprise the use of case bolts extending through the end members and spring clips which hook on the outer portion of the shell and over the end members. It is also been suggested that devices be provided that extend through the end shell and thereafter radially outwardly through openings in the shell. Welding and adhesive have also been used to hold the end head.

In such motors, provision is often made for mounting them by the use of studs that are staked and welded to the end members and extend generally perpendicular. The motors are subjected to shocks and vibration in use of the motor and the mounting of such studs is frequently weak and unable to support the motor during shipping and use. Another problem is the deflection of the end members where the end members are made of sheet metal.

Accordingly, among the objectives of the present invention are to provide a novel structure for mounting studs wherein the end member and stud are held securely to the shell, wherein the strength of the motor is increased, and wherein the stud is accurately held with its axis parallel to the axis of the motor.

In accordance with the invention, the shell has at least one circumferentially extending slot spaced from the edge of the shell and has a notch in the edge aligned with the slot. A spring nut has one end thereof hooked into the slot and extending along the outer surface of the shell. The nut extends inwardly through said notch in underlying relationship to the end member associated with the end of the shell. The end member has an opening therethrough and the spring nut has a threaded opening aligned with the opening in the end member. A stud has a threaded end and an enlarged shoulder portion, the threaded end extends through the opening in the end member and is threaded into the opening of the spring nut.

DESCRIPTION OF THE DRAWINGS

FIG. 1 is a part sectional elevational view of an electric motor embodying the invention.

FIG. 2 is a fragmentary sectional view on an enlarged scale taken along the line 2—2 in FIG. 1.

FIG. 3 is a side elevational view of a portion of the motor during assembly.

FIG. 4 is an exploded view of the parts shown in FIG. 2.

FIG. 5 is a plan view of a spring nut used in the invention.

FIG. 6 is an end view of the spring nut.

DESCRIPTION

Referring to FIG. 1, electric motor 10 comprises a frame 11 that consists of a cylindrical shell 12 and end members or heads 13 made of sheet metal. The end members 13 may also be cast of metal. The shell 13 encircles a stator 14 which is fixed to the shell 12 and the end members 13 cooperate with bearings in the end members to hold the shaft of a rotor and maintain a proper air gap between the rotor 15 and stator 14.

As shown, the shell 12 is formed with circumferentially spaced notches 16 and slots 18 that are arcuately formed in the shell. Each end member 13 is formed with tabs 17 that engage the notches 16. After assembly, the portions 18a of the shell 12 between the slots 18 and the edge of the shell 12 are deformed radially inwardly over the end members 13 to hold the end members in position.

Referring to FIG. 1, in accordance with the invention, one or more studs 20 are mounted in position on one or both end members 13 by an arrangement which includes a second slot 21 spaced axially from but aligned with the notch 16 in the end of the shell 12, a second notch 22 in the base of the first notch 16 and having a lesser width than the first notch 16 and a spring nut 23. Referring to FIGS. 4–6, the spring nut is made of hardened spring steel from a rectangular strip of material and comprises a first leg 24 and a second leg 25. A hook portion 26 is formed on the free end of the first leg 24 and the second leg 25 is formed with an opening 27 that is deformed axially inwardly out of the plane of the second leg 25 and has a portion 28 thereof spaced to form a keyhole configuration so that it can be shaped by stamping to form a thread 29 in the opening. Alternatively, a slit may be formed in the second leg 25 so that it can be shaped to form thread 29. The second leg 25 further includes a free end portion 30 extending upwardly and outwardly.

Referring to FIG. 4, the end member 13 is provided with an opening 31 that is aligned with the opening 27 in the spring nut 23. Stud 20 is formed intermediate its ends with an enlarged shoulder or flange 32 that has a polygonal periphery so that it can be grasped with a wrench or similar tool. The outer end 33 is formed with a fine thread or any thread that a user may require, and the inner end 34 is formed with a course thread (FIG. 2). The end 34 of stud 20 is inserted through the opening 31 and threaded into the opening 27 of the spring nut 23 elastically deforming the leg 25 upwardly as shown in FIG. 2 thereby accurately positioning the stud 20 so that its axis is in parallel alignment with the axis of the motor and further strengthening the plane of the end member 13. By elastically deforming and placing the spring nut 23 under tension, a tight, vibration free system is provided. Also, the spring nut 23 is drawn up tight against the end member 13 allowing the stud 20 to be precisely torqued without extending the spring nut beyond its elastic limit. As a result there will be less tendency for the end member 13 to be deformed by the shock and vibrations of the motor when the motor is mounted utilizing the studs 20.

In assembly, the stator is first assembled to the shell 12 and the spring clip 23 is positioned as shown in FIG. 3 so that it is hooked into the slot 21 and the first leg 24 extends along the outer surface of the shell 12 and the second leg 25 extends radially inwardly through the notch 22. The rotor and end members 13 are then placed in position with the tabs 17 of the end member 13 engaging the first notch 16 and the portions 18 are deformed to hold the end members 13 on the shell 12. The stud 20 is inserted and threaded until the flange portion 32 engages the outer surface of the end member thereby deforming the spring nut 23 to the position shown. In the assembly, the spring nut 23 is merely placed under tension and is not deformed beyond its elastic limit.

I claim:

1. An electric motor comprising:
   a motor,
   said frame comprising a generally cylindrical shell,
   a stator,
   said shell encircling said stator,
   a rotor,
   a pair of end members on the ends of said shell and rotatably supporting said rotor,
   said shell having a plurality of circumferentially extending slots spaced from an edge of said shell,
   said shell having a plurality of notches in said edge aligned with said slot,
   a plurality of spring nuts, each said spring nut having a first leg with one end thereof hooked into said slot and extending along the outer surface of said shell,
   each said nut having a second leg extending radially inwardly through said notch in underlying relationship to said end member associated with said end of said shell,
   said end member having an opening therethrough,
   said second leg of each said spring nut having a threaded opening aligned with the opening in said end member,
   and a plurality of studs,
   each said stud having a threaded end and an enlarged shoulder portion,
   said threaded end extending through said opening in said end member and being threaded into the opening of said spring nut elastically deforming the second leg of the spring nut in tight engagement with the underside of said one end member,
   said shoulder portion of each said stud engaging the outer surface of said end member.

2. The electric motor set forth in claim 1 wherein said first leg of each said stud extends axially, and
   said second leg when in the untensioned position of said nut extends radially at a substantially right angle to said first leg.

3. The electric motor set forth in claim 2 wherein said threaded opening is in said second leg and is offset axially inwardly from said second leg.

4. The electric motor set forth in claim 3 wherein said second leg has a free end portion extending upwardly from the plane of said second leg when the spring nut is in the untensioned state.

5. The electric motor set forth in claim 4 wherein each said spring nut has a substantially uniform width.

6. The electric motor set forth in claim 5 wherein each said spring nut is made of generally flat material such that the first and second leg are generally rectangular.

7. The electric motor set forth in claim 4 wherein the opening in each said spring nut has a portion of the periphery thereof severed to define the threaded opening.

8. The electric motor set forth in claim 7 wherein said severed portion cooperates with the opening to form a keyhole configuration.

9. An electric motor comprising
   a motor,
   said frame comprising a generally cylindrical sheet metal shell,
   a stator,
   said shell encircling said stator,
   a rotor,
   a pair of sheet metal end members mounted on the ends of said shell and rotatably supporting said rotor,
   said shell having a plurality of circumferentially extending slots spaced from an edge of said shell,
   said shell having a plurality of notches in said edge aligned with said slots,
   each said spring nut comprising a first leg extending along the exterior surface of said shell and having a hook thereon which is engaged with said slot, and a second leg which in the untensioned position of said nut extends radially at a substantially right angle to said first leg,
   said second leg extending radially inwardly through said notch in underlying relationship to said end member associated with said end of said shell,
   said end member having a plurality of openings therethrough,
   said second leg of each said spring nut having a threaded opening aligned with the opening in said end member,
   and a plurality of studs,
   each said stud having a threaded and an enlarged shoulder portion,
   said threaded end extending through said opening in said end member and being threaded into the opening of said spring nut elastically deforming the second leg of the spring nut in tight engagement with the underside of said one end member,
   said shoulder portion of each said stud engaging the outer surface of said end member.

10. The electric motor set forth in claim 9 wherein said threaded opening is in said second leg and is offset downwardly from said second leg.

11. The electric motor set forth in claim 10 wherein said second leg has a free end portion extending upwardly from the plane of said second leg when the spring nut is in the untensioned state.

12. The electric motor set forth in claim 11 wherein each said spring nut has a substantially uniform width.

13. The electric motor set forth in claim 12 wherein each said spring nut is made of generally flat material such that the first and second leg are generally rectangular.

14. The electric motor set forth in claim 10 wherein the opening in each said spring nut has a portion of the periphery thereof severed to define the threaded opening.

15. The electric motor set forth in claim 14 wherein said severed portion cooperates with the opening to form a keyhole configuration.

* * * * *